United States Patent [19]

Kalbach

[11] Patent Number: 5,575,042
[45] Date of Patent: Nov. 19, 1996

[54] EYEGLASS RETAINER

[76] Inventor: Edward V. L. Kalbach, 575 West 3200 South, Nibley, Utah 84321-6337

[21] Appl. No.: 371,067

[22] Filed: Jan. 10, 1995

[51] Int. Cl.⁶ .............................. A44B 21/00; G02C 3/00
[52] U.S. Cl. .............................. 24/3.3; 24/3.13; 24/300; 351/156; 351/157
[58] Field of Search ........................... 24/3.3, 3.13, 300, 24/301, 306; 351/157, 156, 123, 43

[56] References Cited

U.S. PATENT DOCUMENTS

| D. 309,619 | 7/1990 | Kalbach . |
| D. 328,908 | 8/1992 | Kalbach . |
| 1,819,738 | 8/1931 | Daniels . |
| 2,481,946 | 9/1949 | Pendleton . |
| 2,539,922 | 1/1951 | Nyberg . |
| 2,660,092 | 11/1953 | Bloom . |
| 2,704,961 | 3/1955 | Weil . |
| 3,397,026 | 8/1968 | Spina . |
| 3,450,467 | 6/1969 | Phillips . |
| 3,502,396 | 3/1970 | Greenberg . |
| 3,874,776 | 4/1975 | Seron . |
| 3,879,804 | 4/1975 | Lawrence . |
| 4,133,604 | 1/1979 | Fuller . |
| 4,541,696 | 9/1985 | Winger et al. . |
| 4,657,364 | 4/1987 | Murrell ............................ 351/156 |
| 4,696,556 | 9/1987 | Perry, III ......................... 351/156 |
| 4,976,531 | 12/1990 | Kahaney ........................ 351/157 |
| 5,002,381 | 3/1991 | Murrell .......................... 351/157 |
| 5,151,778 | 9/1992 | Conley ........................... 351/157 |
| 5,157,425 | 10/1992 | Liu ................................. 351/157 |

FOREIGN PATENT DOCUMENTS

| 0058772 | 12/1981 | European Pat. Off. . |
| 502283 | 11/1954 | Italy . |

Primary Examiner—Victor N. Sakran
Attorney, Agent, or Firm—Trask, Britt & Rossa

[57] ABSTRACT

An eyeglass retainer having an elastic elongate member having an elongate tubular member secured on each of the opposing ends of the elongate member as disclosed. Each tubular member defines a hollow interior recess dimensioned to slidably receive a potion of an eyeglass frame to form a detachable pressure fit therewith. The length of the interior recess is dimensioned to provide the user with a degree of adjustability for purposes of adjusting the tension in the elongate member when the retainer is positioned about the user's head.

8 Claims, 3 Drawing Sheets

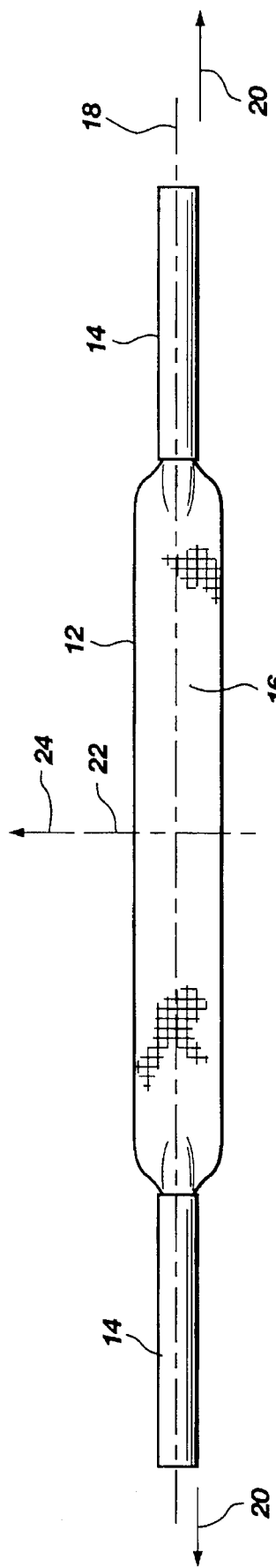
Fig. 2
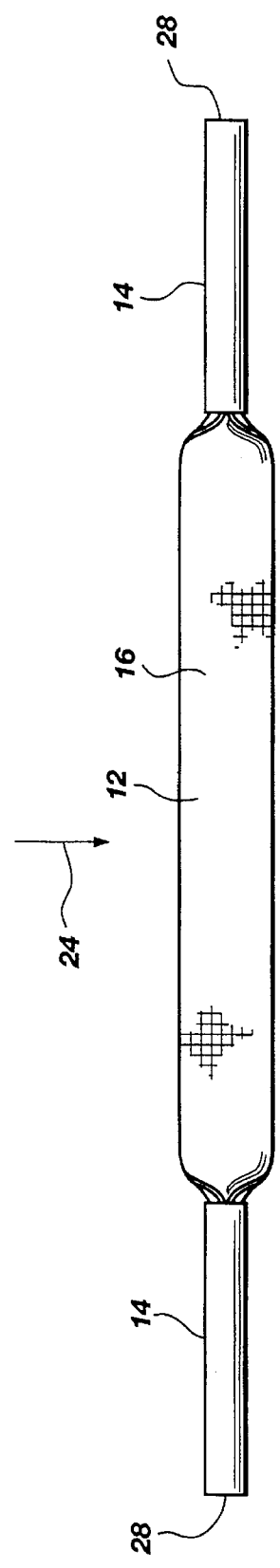
Fig. 3
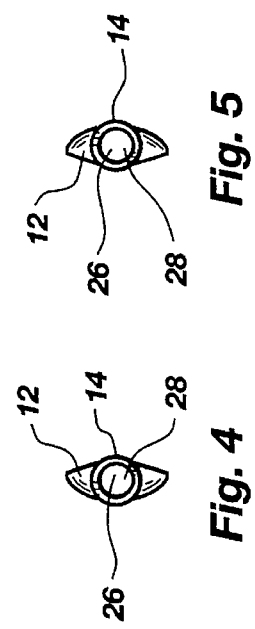
Fig. 4
Fig. 5

EYEGLASS RETAINER

BACKGROUND OF THE INVENTION

1. Field of the Invention

This invention relates to accessories for use with eyeglasses. More specifically, the invention is directed to structures for supporting eyeglasses about the user's head or neck.

2. State of the Art

Eyeglass retainers of various constructions have been known for some time. Such retainers are usually one of two types. In a first construction, the retainer is directed to essentially storing eyeglasses which are not required for continual use by the wearer. In these constructions, the retainer includes an elongate cord having a means of interconnecting the cord to the frame members of a pair of eyeglasses. In many constructions, this means of interconnecting the cord to the eyeglass frames is secured to each of the opposing ends of the cord. The cord is typically an inelastic structure. The cord is dimensioned to essentially form a necklace about the user's neck with the eyeglasses being positioned on the user's chest as the retainer hangs about the user's neck. Owing to the size of the user's head and given the fact that the retainer assembly must pass over the user's head in order to reach its operative location, the cord of such retainers has typically been dimensioned to be relatively long. Representative examples of such retainers are those described in U.S. Pat. No. 2,704,961 (Well) issued 29 Mar. 1955; U.S. Pat. No. 2,539,922 (Nyberg) issued 30 Jan. 1951; U.S. Pat. No. 3,874,776 (Seron) issued 1 Apr. 1975; and U.S. Pat. No. 3,879,804 (Lawrence) issued 29 Apr. 1975. It follows that in many instances the eyeglasses will rest at a location down the user's chest which may not be particularly comfortable or visually attractive. With this disadvantage in mind, many constructions of retainers have adopted the use of a slider positioned on the retainer cord. In those retainer structures which utilize a slider, the cord is oftentimes passed through one channel of the slider and thereafter doubled back on itself and passed through a parallely positioned channel. As the slider is then moved along the length of the cord, the effective length of the cord which forms the operative necklace portion of the retainer is dimensionally reduced. This in turn results in the eyeglasses being positioned higher on the user's chest in a more desirable location. An example of this particular eyeglass retainer structure is illustrated in U.S. Pat. No. 2,660,092 (Bloom) issued 24 Nov. 1954.

The other general type of retainer is used to hold the eyeglasses operationally in place on a user's head. For example, many athletes will utilize such retainers during the course of athletic activities to firmly hold their eyewear in place against dislodgement which would otherwise occur during periods of physical exertion. In these constructions, the inelastic cord as previously described is replaced by an elastic band. The use of the elastic band permits the user to position the retainer about his head and thereby apply a retaining force to the eyeglass frame for purposes of retaining the eyeglasses in an operational positioning. Such constructions are made subject of U.S. Pat. No. 3,450,467 (Phillips) issued 17 Jun. 1969, and U.S. Pat. No. 3,502,396 (Greenberg) issued 24 Mar. 1970.

SUMMARY OF THE INVENTION

The invention includes an elastic, elongate member in association with two elongate tubular members. Each tubular member is secured to a respective end of the elongate member. Each tubular member defines a hollow interior space and a pair of opposing openings which communicate the interior space to exterior of the tubular member. One end of the elongate member is inserted into one of these opposing openings and is thereafter secured to the tubular member. The other opposing opening provides a means for introducing a portion of the frame of the eyeglasses into the interior space. The tubular member is fabricated from an elastic material which permits the diameter of the interior space to expand to receive the portion of the eyeglass frame. The interior space, which may be considered to be an elongate channel, is dimensioned to have a length sufficient to provide the user with a means of adjusting the length of the perimeter of the assembly formed by the association of the retainer with the eyeglasses. In other words, the length of the interior space is dimensioned such that the eyeglass frame may be inserted into the tubular member a greater length than would otherwise be necessary in order to secure the retainer to the eyeglass frame. By providing this additional length, the user may adjust the tension of the retainer about the user's head by adjusting the extent that the frame is inserted into the tubular member.

BRIEF DESCRIPTION OF THE DRAWINGS

FIG. 2 is a front elevational view of the retainer;

FIG. 3 is a rear elevational view of the retainer of FIG. 1;

FIG. 4 is a left end view of the retainer;

FIG. 5 is a right end view of the retainer;

DETAILED DESCRIPTION OF THE ILLUSTRATED EMBODIMENT

Figure 1:
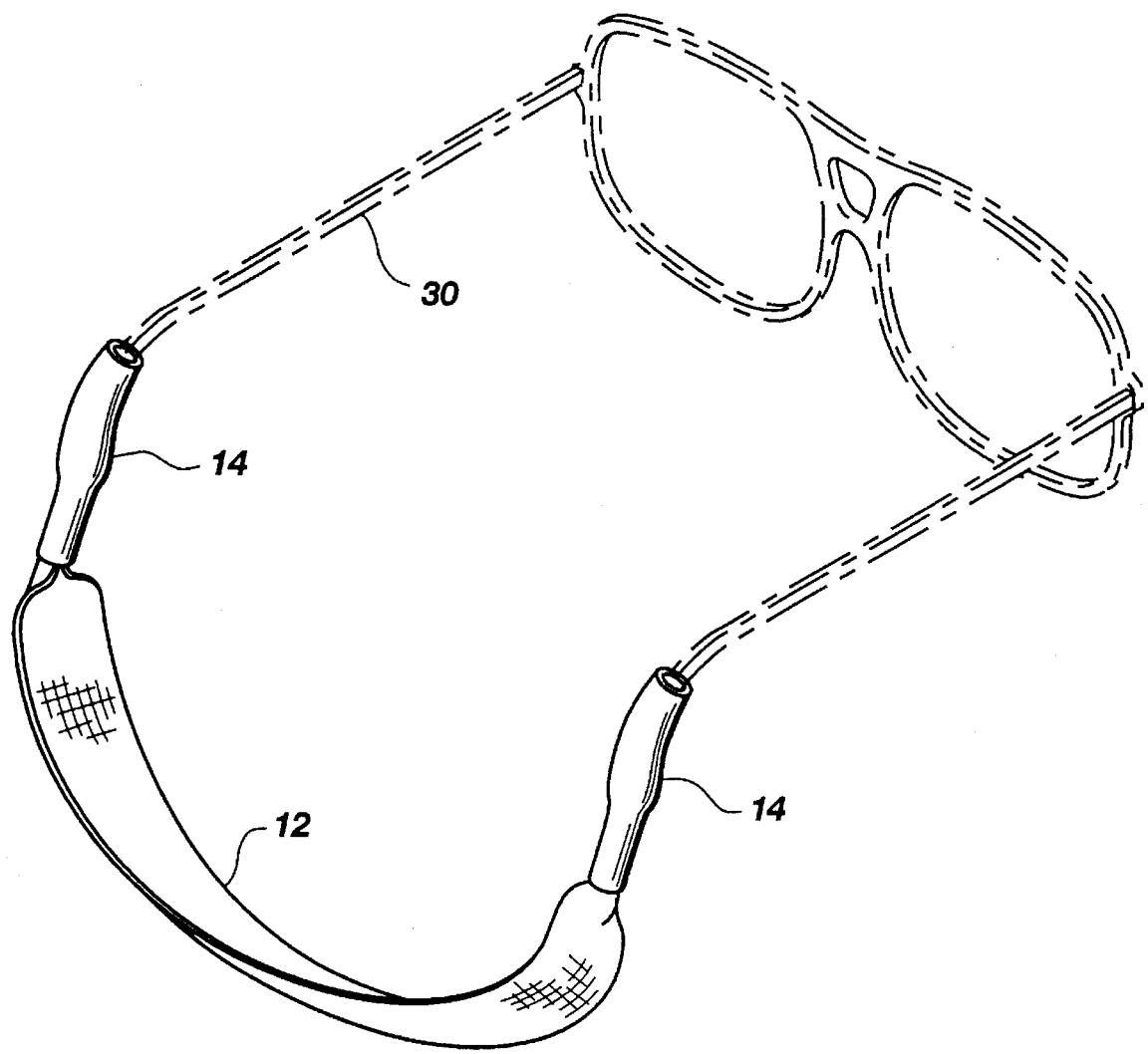
FIG. 1 is a perspective view of an eyeglass retainer of the instant invention with the frame of a pair of eyeglasses being shown in broken lines.
Figure 6:
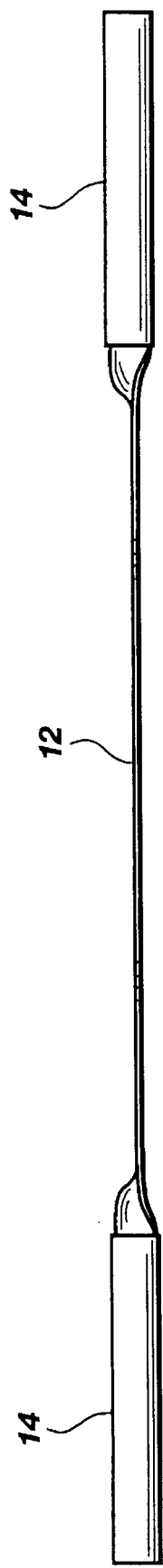
FIG. 6 is a bottom view of the retainer.
Figure 7:
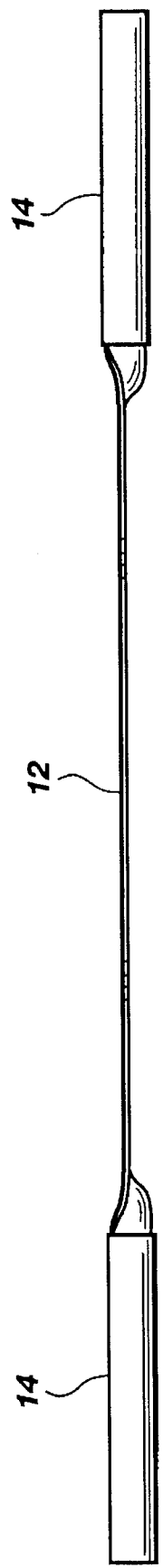
FIG. 7 is a top view of the retainer.
Figure 8:
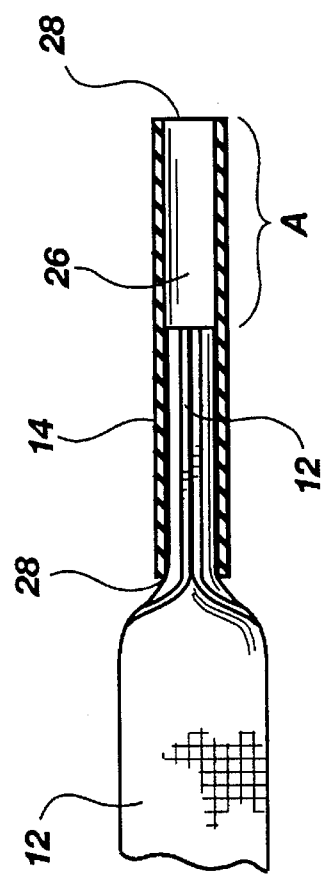
FIG. 8 is a cross sectional view of a portion of the retainer.

As illustrated in FIG. 1, an eyeglass retainer of the instant invention may include an elongate member 12 in association with a pair of retaining members 14. As more clearly shown to advantage in FIGS. 2 through 7, the elongate member 12 may be constructed as a thin, planar panel in the form of an elongate, rectangular member having a generally planar appearance on both its front and rear faces 16. The member is preferably fabricated from an elastic material which permits the member to stretch in the direction of its longitudinal axis 18 as indicated by arrows 20 as well as in the direction of its lateral axis 22 in the directions indicated by arrows 24.

Positioned on each end of the panel 12 is a respective retaining member 14. The end portion of the member 12 is folded over on itself and inserted a distance into a respective retaining member 14. The member 12 may thereafter be secured to the retaining member by a number of means including adhesive, heat shrinking or other means known in the art. Each of the retaining members 14 is formed as a hollow, cylindrical tube. Each retaining member 14 defines a generally cylindrical channel or interior space 26 which extends through the entire length of member 14. The channel 26 communicates with the exterior of the member 14 by a pair of openings 28. Each of these openings is positioned proximate a respective end of the member 14. The diameter of the channel 26 may be constant over its entire length.

The member 14 is preferably fabricated from an elastic material such as rubber, or a synthetic material which duplicates the elastic properties of rubber. The material preferably possesses a high coefficient of friction such that when a portion of the frame of a pair of eyeglasses 30 is inserted into the interior channel 26, not only does the retainer and hence the channel 26 dimensionally expand to receive the portion of the frame but furthermore, the interior sidewall of the channel is abutted against the frame to produce an interface which exhibits a high coefficient of friction between the retainer and the frame 30. It follows that as the frame is inserted into the channel 26, the retainer is stretched and placed in tension, which in turn effects a pressure fit union of the retainer with the frame 30. When the user desires to detach the frame from the retainer 14, the user simply places his fingers on the retainer and pushes the frame outwardly away from the retainer. Should the user attempt to pull the frame away from the retainer, the nature of the retainer's constructions causes the retaining member 14 to constrict even tighter about the frame, thereby strengthening the pressure fit.

The portion A of the channel 26 which remains available for the insertion of the frame 30 is preferably within the range of ¾ of an inch to two inches. Channels of greater length may also be used.

The instant invention provides a retainer which may be used to retain a pair of eyeglasses about the user's head. The use of the elastic member 12 in conjunction with the adjustable retaining members 14 provides the user with a construction which at once provides an elastic, stretchable band while permitting the user to further adjust the tension by adjusting the band by adjusting the effective length of the retainer 14.

Those skilled in the art will recognize that the embodiment illustrated herein is illustrative of the general principles of the invention. The embodiment discussed herein is not intended to limit the scope of the claims which themselves recite what applicant regards as his invention.

What is claimed is:

1. An eyeglass retainer comprising:

an elongate panel fabricated from a first elastic material having opposing ends, said panel being folded over on itself proximate each of said ends thereby bringing the opposing sides of said panel into abutment one against the other; and two elongate tubular members, each said elongate tubular member being fabricated of a second elastic material, each said elongate tubular member defining a channel therein dimensioned to receive a portion of an eyeglass frame upon an elastic expansion of said elongate tubular member;

wherein each said folded over opposing end of said elongate panel is positioned within a said channel of a respective elongate member to fall a portion of the length of said channel, each said opposing end being fixedly secured to said respective elongate tubular member.

2. The eyeglass retainer of claim 1 wherein said second elastic material includes a high coefficient of friction.

3. The eyeglass retainer of claim 1 wherein said elongate tubular member is cylindrical in configuration.

4. The eyeglass retainer of claim 1 wherein said recess is dimensioned to provide adjustability for said retainer by permitting a user to position said portion of said eyeglass frame at various locations within said recess while retaining a detachable union of said tubular member with said portion of said eyeglass frame.

5. The eyeglass retainer of claim 1 wherein said recess has a depth of between ¾ inch and 2 inches.

6. The eyeglass retainer of claim 1 wherein said elongate strip is stretchable in the direction of its longitudinal axis.

7. The eyeglass retainer of claim 1 wherein said elongate strip is stretchable in the direction of its lateral axis.

8. The eyeglass retainer of claim 1, wherein said elongate tubular member is fabricated from a synthetic rubber-like material.

\* \* \* \* \*